United States Patent
Ahlberg

(10) Patent No.: US 10,504,629 B2
(45) Date of Patent: Dec. 10, 2019

(54) SYSTEM AND METHOD FOR NUCLEAR FUEL ASSEMBLY DEFORMATION MEASUREMENT

(71) Applicant: Ahlberg Cameras AB, Norrtälje (SE)

(72) Inventor: Joakim Ahlberg, Stockholm (SE)

(73) Assignee: Ahlberg Camera AB, Norrtälje (SE)

( * ) Notice: Subject to any disclaimer, the term of this patent is extended or adjusted under 35 U.S.C. 154(b) by 483 days.

(21) Appl. No.: 14/791,270

(22) Filed: Jul. 3, 2015

(65) Prior Publication Data

US 2016/0012925 A1    Jan. 14, 2016

Related U.S. Application Data

(60) Provisional application No. 62/021,728, filed on Jul. 8, 2014.

(30) Foreign Application Priority Data

Jul. 8, 2014   (EP) ..................................... 14176148

(51) Int. Cl.
*G21C 17/06*    (2006.01)
*G21D 3/00*    (2006.01)

(52) U.S. Cl.
CPC ............. *G21C 17/06* (2013.01); *G21D 3/001* (2013.01); *Y02E 30/40* (2013.01)

(58) Field of Classification Search
CPC ...... G21C 17/003; G21C 17/08; G21C 19/26; G01B 11/002; G01B 11/14; G01B 11/16; G01N 2021/8861
See application file for complete search history.

(56) References Cited

U.S. PATENT DOCUMENTS

2011/0013012 A1    1/2011 Hummel et al.
2011/0182393 A1*   7/2011 Hequet .................. G01B 11/16
                                                          376/248

FOREIGN PATENT DOCUMENTS

DE     19947327 A1    5/2001
JP     2000-9880 A    1/2000
WO     2005-027141 A1    3/2005

OTHER PUBLICATIONS

Extended European Search Report dated Dec. 15, 2014, issued in corresponding Application No. EP14176148.6, filed Jul. 8, 2014.

* cited by examiner

*Primary Examiner* — Sharon M Davis
(74) *Attorney, Agent, or Firm* — Davis Wright Tremaine LLP

(57) ABSTRACT

A method, system and computer program product for measuring a spatial displacement of at least a part of an irradiating nuclear fuel assembly. The system comprising a memory and a processor configured to receive data from said memory. The processor and the computer program being configured to: receive a first image data frame, captured using an imaging system, said first image data frame comprising information representing a first view of an observed real world scene comprising at least a part of a fuel assembly, wherein said first image data frame is captured from a first direction; generate a set of reference coordinates, corresponding to image coordinates of said first image data frame; and extract measurement data indicative of a spatial displacement relating to at least a part of said fuel assembly, based on information from said first image data frame and information from said set of reference coordinates.

8 Claims, 12 Drawing Sheets

SYSTEM AND METHOD FOR NUCLEAR FUEL ASSEMBLY DEFORMATION MEASUREMENT

TECHNICAL FIELD

The present disclosure relates to measurement of a nuclear fuel assembly, to detect deformations of the fuel assembly, in particular bow deformation or other curvature deformation.

BACKGROUND AND RELATED ART

In the nuclear power industry it is extremely important to continuously monitor the status of the fuel assemblies used in a nuclear reactor. Examples of the parameters monitored are handling damage, oxide growth, presence of foreign objects and curvature.

In nuclear power reactors, the reactor core is comprised of a number of fuel assemblies. Depending on the size of the reactor, there can be for example 100 or more fuel assemblies in the core at any time. Since the fuel assemblies are densely packed in predetermined positions in the reactor core, dimensional standards of each fuel assembly must be met within very close tolerances. Pre-service quality assurance inspections are performed to ascertain any deviations in the formation and assembly of new fuel assemblies from accepted tolerances. The fuel assembly is also inspected to determine whether it is straight, unbowed, and without any twist.

During reactor operation, the fuel assemblies become irradiated/irradiating and can become bowed and twisted due to differential growth resulting from high temperatures, temperature gradients, pressure, vibrations and water flow. During each reactor refueling cycle, fuel assemblies are moved to different locations in the reactor core, with some of the fuel assemblies being replaced by new fuel assemblies. Certain fuel assemblies become spent and are removed from the reactor. Since at least a portion of the irradiated fuel assemblies are moved from one location in the reactor core and eventually to another location in the core during refueling operations, there is a need to verify the continued serviceability of these fuel assemblies.

Thus, the accurate and efficient determination of deviations from dimensional standards of the fuel assembly as well as whether the fuel assembly is unbowed and without twist is particularly important for irradiated/irradiating fuel assemblies which have to be inspected and remotely manipulated to protect personnel against exposure. Furthermore, there is an increased risk of damaging a fuel assembly when it is moved, for example lifting it from its position in a core into an inspection stand.

Deformation of the fuel assembly can prevent the accurate alignment of the fuel assembly with the lower core plate, cause interference with adjacent components/fuel assemblies, and in extreme cases make it impossible to insert the control rods, which is a reactor safety issue. In addition, the deformation of the fuel assembly is frequently not perceived until the fuel assembly is attempted to be placed in its constrained position within the reactor core.

In some prior art solutions, bow or curvature is measured by relocating a fuel assembly to an intermediate location to perform the measurements, leading to very expensive down-time if the fuel assembly is in use at a nuclear power plant. A fuel assembly that is located near a control rod and is too deformed, for example to bent, must be replaced, which is a time consuming and costly process. Due to the high cost for down-time, only a selection of the fuel assemblies can be measured using prior art solutions and the state of the remaining fuel assemblies are not considered or approximated from previous measurements of those fuel assemblies. In some embodiments, the majority of the fuel assemblies at control rod positions are measured, but not many of the remaining fuel assemblies. As selection is typically manually performed, there is always a risk of human errors, for example forgetting a fuel assembly that should have been measured.

Measurement of deformations are typically performed using a physical reference object, for example a wire, placed relative to the fuel assembly, and distance comparisons are then performed manually, through visual inspection of the fuel assembly relative to the reference object, or using a distance measurement device.

There is a need for a deformation measurement method that is less expensive, less time-consuming, reduces the risk of introducing human errors, poses a lower risk of introducing additional deformations during measurement, and/or enables accurate measurement of all, or at least most of, the fuel assemblies in a reactor core.

SUMMARY

It is a general object of the invention to provide a system for measuring nuclear fuel assembly deformation/bow which avoids the disadvantages of the prior art teachings while affording greater facility of operation.

In order to solve the prior art problems, the inventors have realized that it is beneficial to integrate inspection and deformation measurement with the necessary stages in the maintenance of a nuclear reactor or during necessary stages in moving fuel assemblies, for example when moving a fuel assembly from a nuclear reactor to a fuel pool, or from a fuel pool to a dry cask in preparation of final disposal. According to embodiments of the present disclosure, a sequence of image data frames showing at least one side of a fuel assembly is captured when the fuel assemblies are moved from the reactor to a second location, for example during maintenance of a nuclear reactor or in preparation of final disposal of the fuel. Thereby, image data is obtained without requiring any extra down-time of the reactor, or additional time in preparation of final disposal, as is the case for many prior art methods. The imaging system of embodiments presented herein may be configured to capture image data frames representing four planar sides of a four faced fuel assembly, six planar sides of a six faced fuel assembly, or one or more sides or views of a fuel assembly of any other shape. The imaging system may be configured to capture image data during inspection or maintenance of a nuclear reactor.

According to an aspect of the invention, there is provided a method for measuring a spatial displacement relating to at least a part of an irradiating nuclear fuel assembly, the method comprising:

receiving a first image data frame, captured using an imaging system, said first image data frame comprising information representing a first view of an observed real world scene comprising at least a part of an irradiating nuclear fuel assembly, wherein said first image data frame is captured from a first direction;

generating a set of reference coordinates, corresponding to image coordinates of said first image data frame; and extracting measurement data indicative of a spatial displacement relating to at least a part of said irradiating fuel assembly, based on information from said first image data frame and information from said set of reference coordinates.

In further aspects of the invention, said at least a part of a fuel assembly comprises the entire fuel assembly and/or said at least a part of a fuel assembly comprises one or more fuel rods comprised in said fuel assembly.

The generating a set of reference coordinates, corresponding to image coordinates of said first image data frame may comprise:

receiving a second image data frame, captured using said imaging system, wherein said second image data frame comprises information representing a second view of an observed real world scene comprising at least a part of said irradiating nuclear fuel assembly, wherein said second image data frame is captured from said first direction;

generating a first combined image by combining image data from said first image data frame with image data from said second image data frame; and determining a set of two or more reference image coordinates that have a predetermined relation to expected image positions of predetermined parts of said fuel assembly based on said first combined image.

Further, extracting measurement data indicative of a spatial displacement relating to at least a part of said irradiating fuel assembly, based on information from said first image data frame and information from said set of reference coordinates may comprise:

identifying said predetermined parts of the fuel assembly in said first image;

determining a set of measured image coordinates, wherein each of the measured image coordinates of said set of measured image coordinates is associated with a reference image coordinate comprised in the set of reference image coordinates, wherein measured image coordinates in said set of measured image coordinates relate to image positions in which said predetermined parts of the fuel assembly are identified in said first image; and extracting measurement data indicative of a spatial displacement, by determining the displacement between each of said image coordinates of said set of reference image coordinates and the corresponding image coordinate of said set of measured image coordinates.

Further aspects of the invention may comprise approximating a reference line, by performing a linear approximation based on two or more reference image coordinates comprised in said set of reference coordinates.

In different further aspects of the invention:

The extracting measurement data indicative of a spatial displacement is performed for each image data frame in a set of image data frames.

The spatial displacement is indicative of a deformation of said at least a part of said fuel assembly depicted in the first and the second image.

The spatial displacement is indicative of debris within said fuel assembly.

The method may comprise determining if one or more part of the fuel assembly comprises a deformation, based on the extracted measurement data.

According to a further aspect of the invention there is provided a system for measuring a spatial displacement relating to at least a part of an irradiating nuclear fuel assembly, the system comprising:

a memory; and
a processor configured to receive data from said memory, the processor further being configured to:
i) receive a first image data frame, captured using an imaging system, said first image data frame comprising information representing a first view of an observed real world scene comprising at least a part of an irradiating nuclear fuel assembly, wherein said first image data frame is captured from a first direction;
ii) generate a set of reference coordinates, corresponding to image coordinates of said first image data frame; and
iii) extract measurement data indicative of a spatial displacement relating to at least a part of said irradiating fuel assembly, based on information from said first image data frame and information from said set of reference coordinates.

The processor may further be configured to perform any or all of the method steps and functions recited herein.

Yet a further aspect of the invention provides a computer program product configured to, when executed in a computing device, control a processor to measure a spatial displacement relating to at least a part of an irradiating nuclear fuel assembly, by:

receiving a first image data frame, captured using an imaging system, said first image data frame comprising information representing a first view of an observed real world scene comprising at least a part of an irradiating nuclear fuel assembly, wherein said first image data frame is captured from a first direction;
generating a set of reference coordinates, corresponding to image coordinates of said first image data frame; and
extracting measurement data indicative of a spatial displacement relating to at least a part of said irradiating fuel assembly, based on information from said first image data frame and information from said set of reference coordinates.

The computer program product may further be configured to perform any or all of the method steps and functions recited herein.

Method, System and computer program product embodiments are further described in the attached claims and detailed description.

BRIEF DESCRIPTION OF DRAWINGS

Embodiments of the invention will now be described in more detail with reference to the appended drawings, wherein.

DETAILED DESCRIPTION

Introduction

Figure 1:
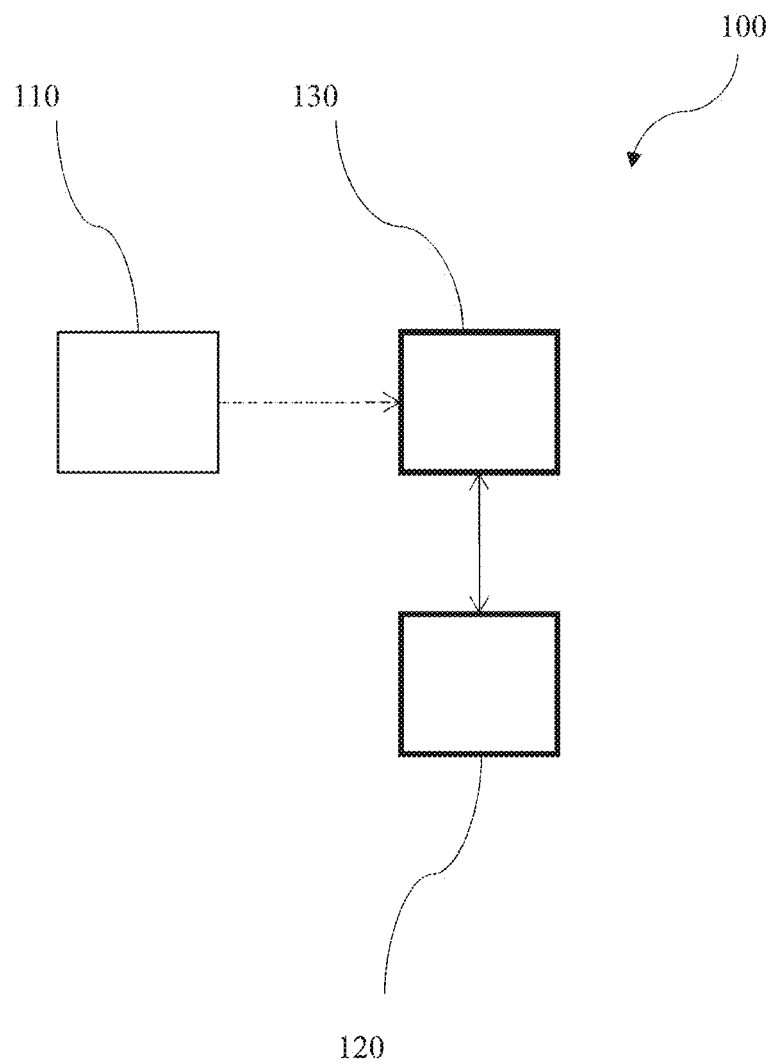
FIG. 1 shows a schematic view of a measurement system according to embodiments.

According to aspects of the present disclosure there is provided methods, systems and computer program products for extracting measurement data indicative of a spatial displacement relating to at least a part of an irradiating fuel assembly.

A spatial displacement indicated by the extracted measurement data may for example be a selection of the following: a deformation of a fuel assembly; a deformation of one or more fuel rods comprised in a fuel assembly; bow of a fuel assembly; bow of one or more fuel rods comprised in a fuel assembly; twist of a fuel assembly; twist of one or more fuel rods comprised in a fuel assembly; change of form and/or diameter of one or more fuel rods comprised in a fuel assembly; increase/decrease in gap sizes between fuel rods comprised in a fuel assembly; debris detected within said fuel assembly; a damaged spacer grid; location of rods in a y direction compared to an expected location in the y direction; width of the rods; angle of the rods; and/or if a spacer grid, the top nozzle and/or bottom nozzle has been tilted compared to the elongation direction of the fuel assembly.

The spatial displacements are in many cases indicative of potential security hazards and may lead to damages and/or expensive down-time of the reactor core if left unnoticed. Furthermore, information on any spatial displacements over time may be used for trending of deviations and predictions of upcoming problems. Information on spatial displacements may further be used for optimization of placement of fuel assemblies in a reactor core, thereby enabling optimization of reactor core efficiency and sustainability. Thereby, a preventive approach to detecting problems with and/or optimizing the performance of a nuclear reactor core is enabled. This in contrast to prior art methods where measurement data is typically not available until after replacement of fuel assemblies, meaning that any optimization of the reactor core will have to wait 12-18 months or so, when the next inspection is performed.

The present disclosure is particularly advantageous in that the method and system embodiments presented herein provides information on any or all of these spatial displacements from image data that has been retrieved at a previous measurement of the fuel assemblies, for example during inspection or maintenance. Thereby, additional information and basis for decision on how to optimize the reactor core or where to look for defects, debris et cetera is provided without the need for extra measurements of fuel assemblies.

A nuclear reactor core may comprise 100 fuel assemblies or more, making it clear that time does not allow for all fuel assemblies to be measured at one inspection session if the measurements session comprises time consuming and/or manual steps. Therefore, the automatic method of the present disclosure, making measurements and calculations based on already available image data, is preferable. Methods and systems presented herein enable reliable measurement of all or a large selection of the fuel assemblies comprised in a reactor core.

Another advantage compared to prior art methods is that the measurements according to some embodiments herein, wherein the image data is captured during inspection or maintenance of a fuel assembly, does not add any extra time consuming step and in other words does not affect the critical path to the process of inspecting a fuel assembly.

A further advantage is that the risk of damaging the fuel rods or other parts of the fuel assembly is greatly reduced, as the extra relocation of the fuel assembly for inspection purposes is made redundant.

In order to obtain extracted measurement data according to the embodiments presented herein, it is apparent to a person skilled in the art that it would also be possible to use image data captured in any other way, for example from a separate measurement of one or more fuel assembly, wherein the one or more fuel assemblies are placed in a fixture of any kind known in the art and one or more imaging devices are used for capturing images from one or more directions. In some embodiments, the one or more imaging devices are located in the reactor pool during the capturing of data, whereby the measurements are performed in line.

A further advantage is that all captured image data captured using the four face imaging system may be stored and retrieved for interpretation, analysis and/or calculations at a later time. Thereby, determination of fuel assembly deformation may be performed on-site or off-site.

System Architecture

According to an aspect of the invention, illustrated in FIG. 1, there is provided a measurement system 100 comprising a processor 120 configured to receive or retrieve data from a memory 130. The processor 120 may further be configured to communicate data to the memory 130 for storage. The processor 120 is according to embodiments configured to perform image processing and/or calculations on image data, including any or all of the method steps and functions presented herein. In embodiments, the system 100 is connected to an imaging system 110 configured to capture image data and further to communicate captured image data to the memory 130. The image data may be communicated to and stored in the memory 130 during capturing of the image data, i.e. in real or near real time. Alternatively, the image data may be pre-stored in the memory 130 and retrieved by the processor 120 for post-processing analysis.

The processor 120 may be configured to retrieve image data and image data related information from, and/or to store image data and image data related information in, an external storage device connected to, communicatively coupled to or arranged to receive data from and/or prepare data for processing by the measurement system 100. In embodiments illustrated in FIG. 1B, the external storage device may be a memory 152 integrated in an external device 150, wherein the memory 152 may be configured to communicate with one or more units of the measurement system 100 over a communications network 170, in some embodiments via a communications interface 156 of the external device and a corresponding communications interface 160 of the measurement system.

Figure 2:
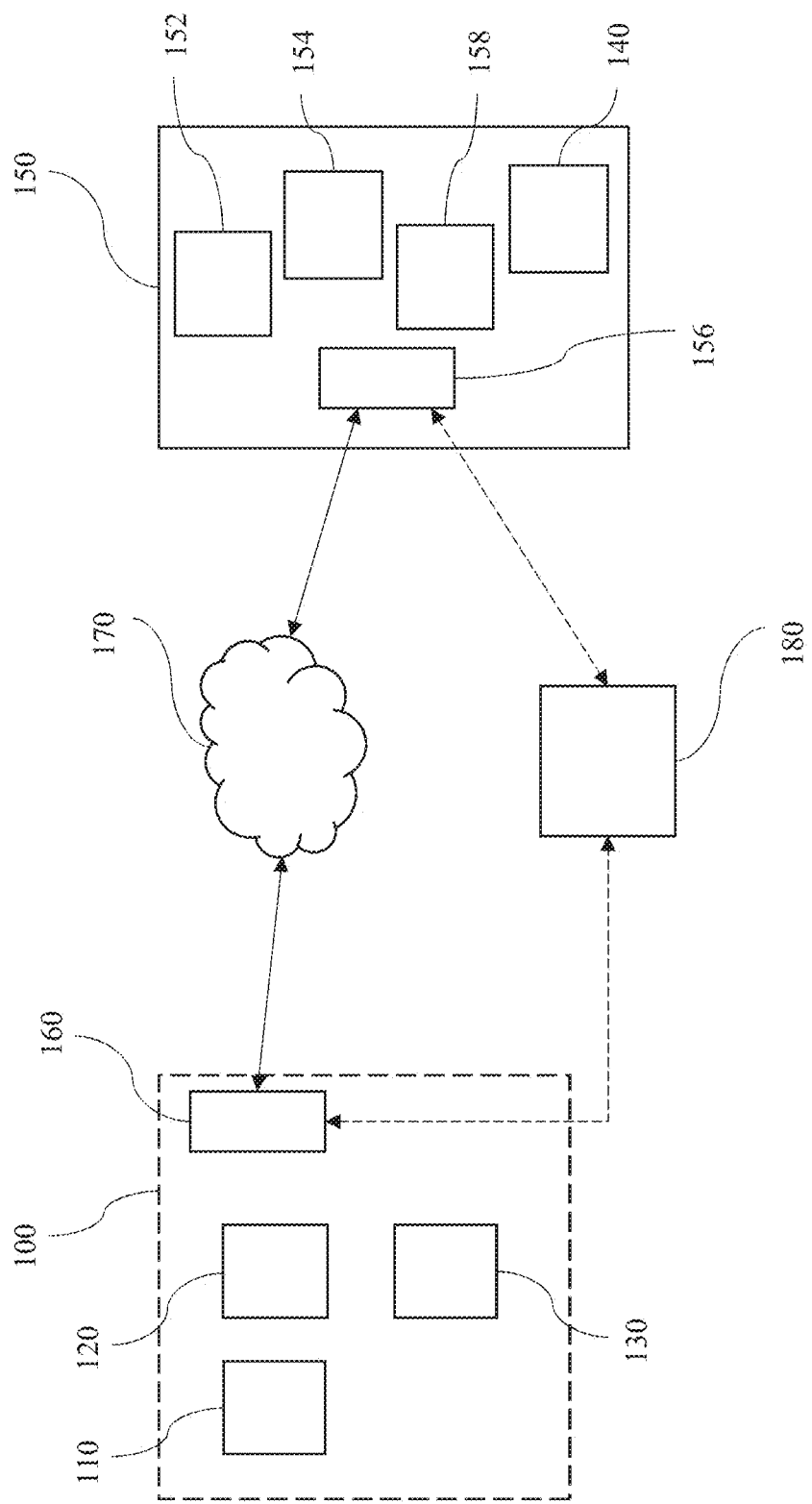
FIG. 2 shows a schematic view of a measurement system environment according to embodiments.

In other embodiments illustrated in FIG. 2, the external storage device may be an external memory 180 configured to receive information from and/or communicate information to one or more units of the measurement system 100 and/or an external device 150. For example, the external memory 180 may be a portable memory.

The external device 150 may comprise a processor 154 configured to perform any or all of the method steps and functions described herein on image data received from the measurement system 100. Optionally, the external device comprises an inputter 158 configured to receive input from a user interacting with the inputter 158; to generate a control signal in response to receiving an input; and to communicate the control signal to the processor 154. The processor 154 may be configured to receive a control signal from the inputter 158. The external device 150 and the measurement system 100 may be configured to communicate via a respective communications interface 156, 160, as illustrated in FIG. 1B.

In embodiments, the external device 150 comprises a display 140 configured to display a visual representation of image data and/or image data measurement related information to a user of the system. The display 140 may be integrated in, connected to, communicatively coupled to or configured to receive data from the other components of the external device 150. In embodiments, the system 100 is configured to communicate image data information to and/or receive image data information from one or more external devices 150.

Figure 7:
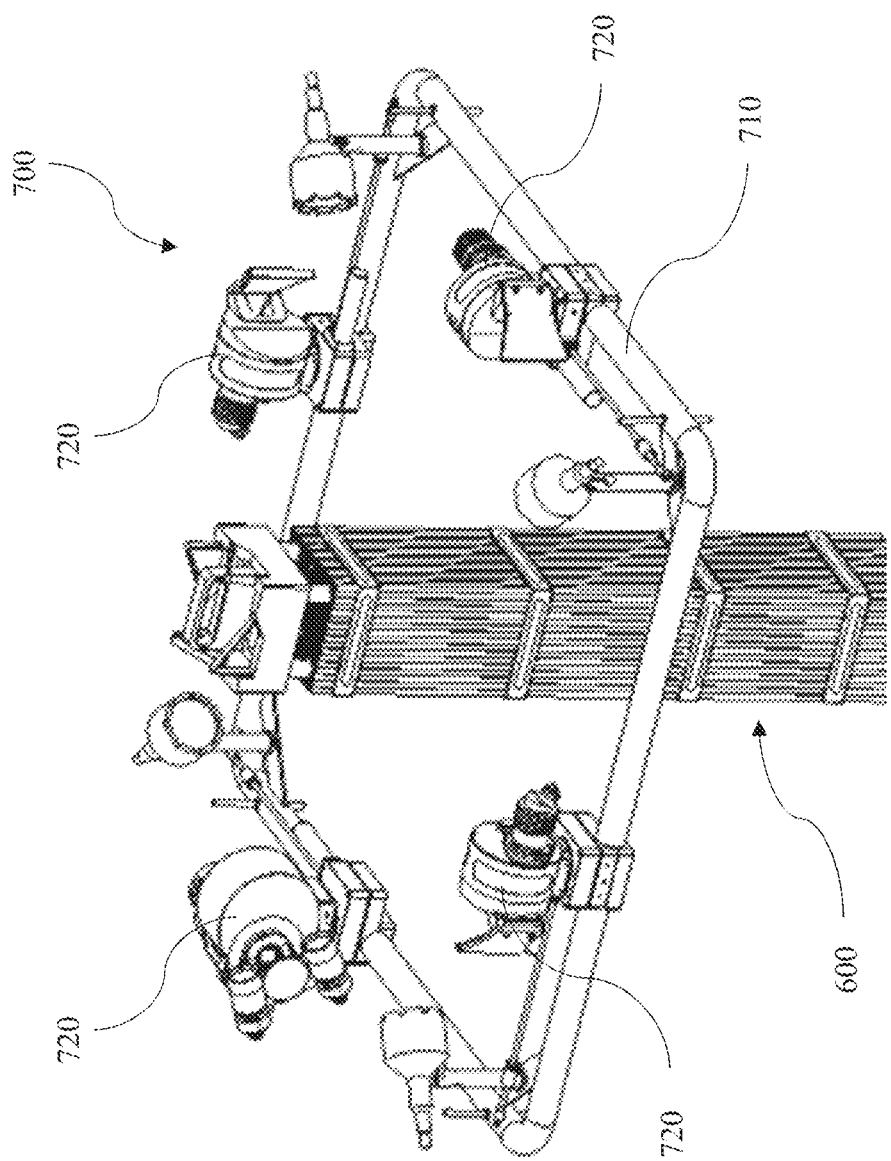
FIG. 7 shows an embodiment of an imaging system.

In a non-limiting example, the imaging system 110 is a four face imaging system 700 arranged to simultaneously capture images of the four faces of a fuel assembly. Such an exemplary four face imaging system is shown in FIG. 7, the system comprising a rig 710 which in the embodiment depicted comprises generally a right-angled frame which is generally situated in one plane. For exemplifying and non-limiting purposes it may be mentioned that the dimensions of the frame may be 120×130 cm but will vary depending on the dimensions of the measured fuel assembly and the available space in connection to the nuclear power station where the system 700 is to be used. In some embodiments, the system 700 comprises four in principle identical imaging devices/cameras 720 for underwater use mounted on the rig 710, and more specifically on the frame, according to the pattern indicated in FIG. 7. The four imaging devices 720 are thus in some embodiments mounted in the region of the corners of the rectangular frame. The imaging devices 720 are in embodiments mounted in pairs diametrically opposite one another. The imaging devices 720 for underwater use may be color camera units based on digital semiconductor technology, in some embodiments CCD TV cameras, but any suitable type of imaging device may be used. The imaging devices 720 are preferably of a similar kind, particularly with regards to all imaging devices 720 having high radiation resistance.

Figure 6A:
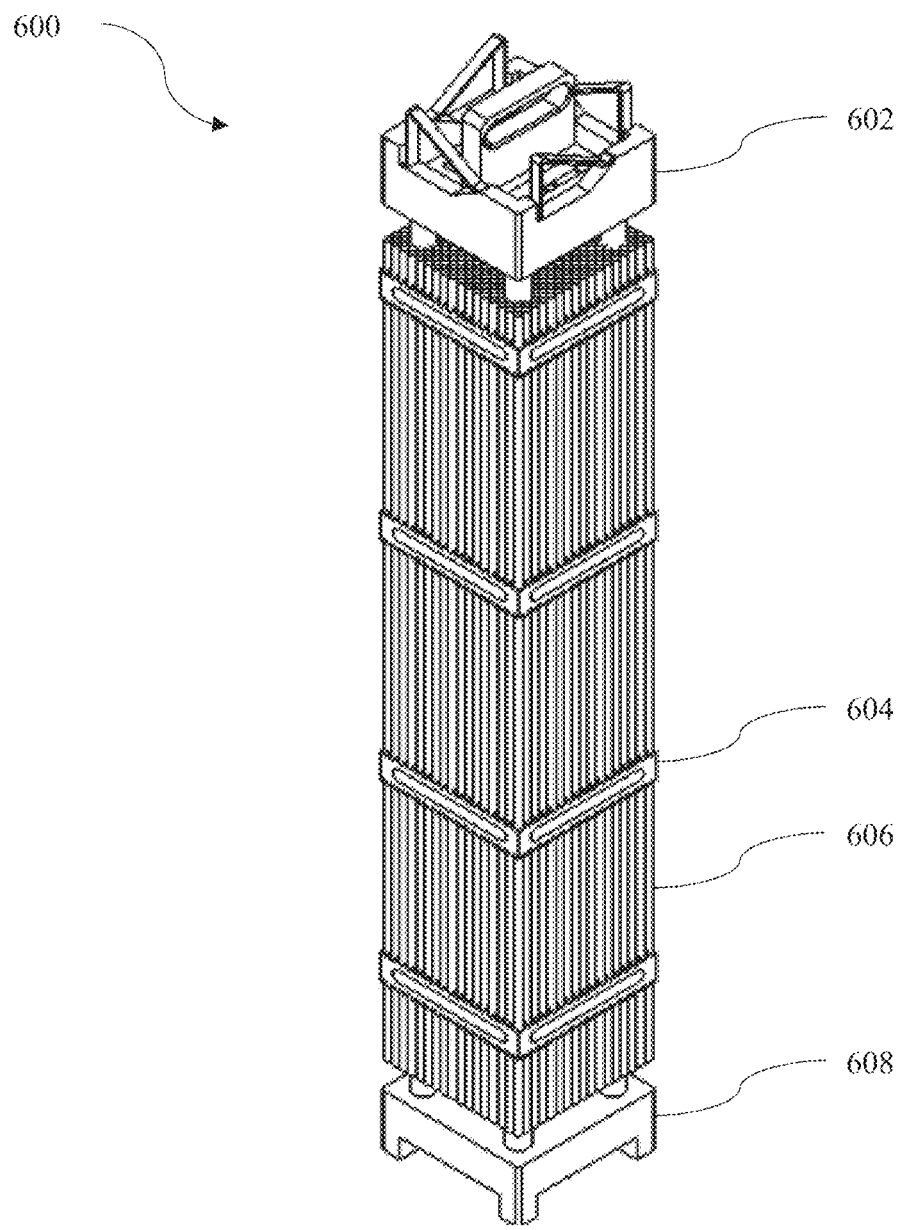
FIG. 6A shows a perspective view of a fuel assembly according to some embodiments.
Figure 6B:
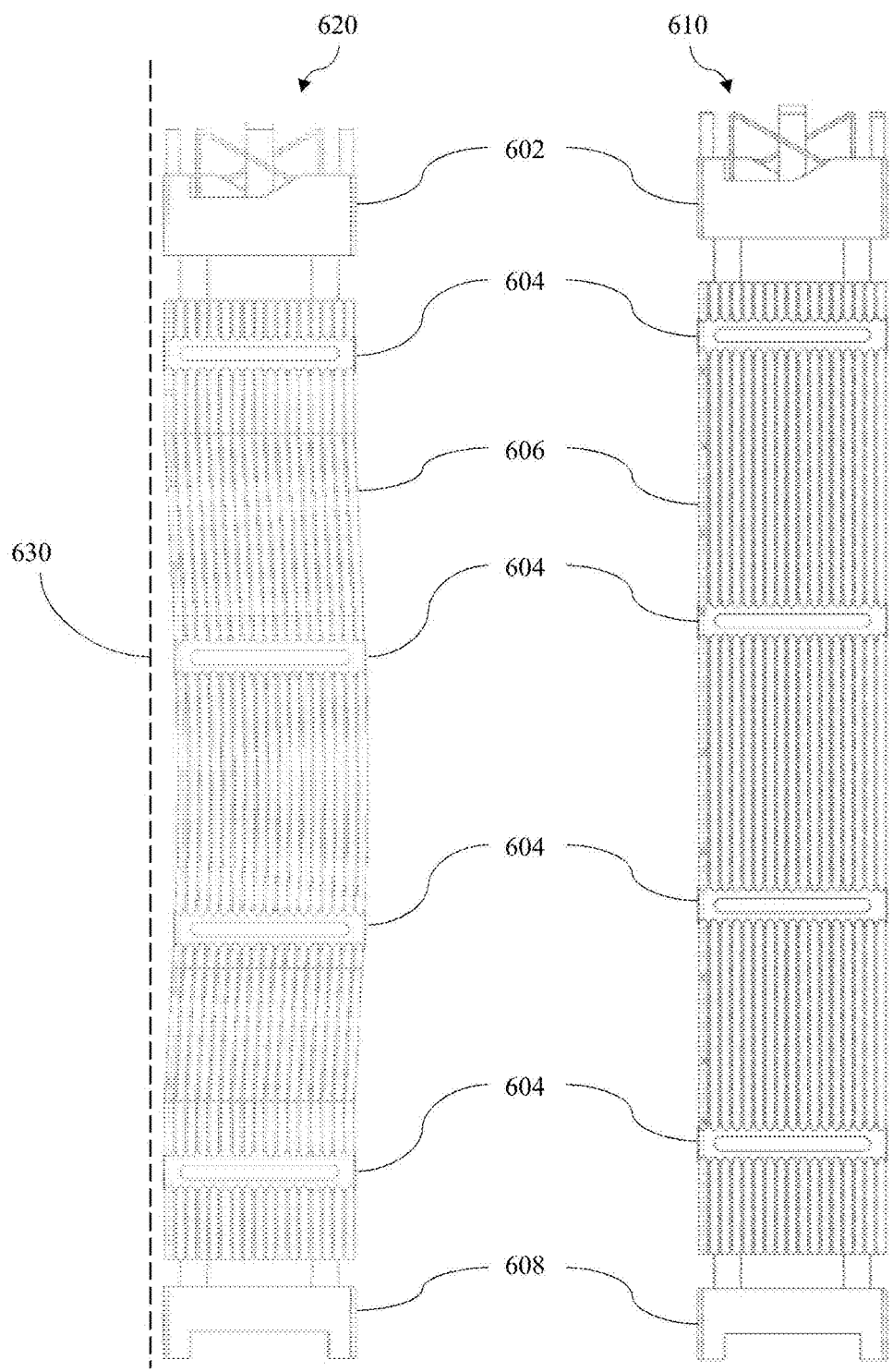
FIG. 6B shows an illustrative example of one bowed fuel assembly and one unbowed fuel assembly, for comparison.

In a non-limiting example illustrated in FIGS. 6A and 6B, fuel assemblies measured using the inventive methods and systems have four planar sides. However, the methods and systems described herein are equally applicable for measurements of fuel assemblies of any other suitable shape, for example an assembly having six or more planar sides, or an assembly substantially in the shape of a circular or elliptic cylinder.

FIG. 6A shows a perspective view of a fuel assembly 600 measured according to embodiments of the invention. The fuel assembly 600 of FIG. 6A comprises a number of fuel rods 606, held in place by a number of spacer grids 604, a top nozzle 602 and a bottom nozzle 608.

FIG. 6B shows an illustrative example of one bowed fuel assembly and one unbowed fuel assembly. Similar to the fuel assembly 600 of FIG. 6A, the fuel assemblies 610 and 620 of FIG. 6B each comprise a number of fuel rods 606, held in place by a number of spacer grids 604, a top nozzle 602 and a bottom nozzle 608. The fuel assembly 610 is unbowed, while fuel assembly 620 is deformed, in this case bowed, as can be seen when compared to the reference line 630.

Embodiments of the Invention

Figure 3:
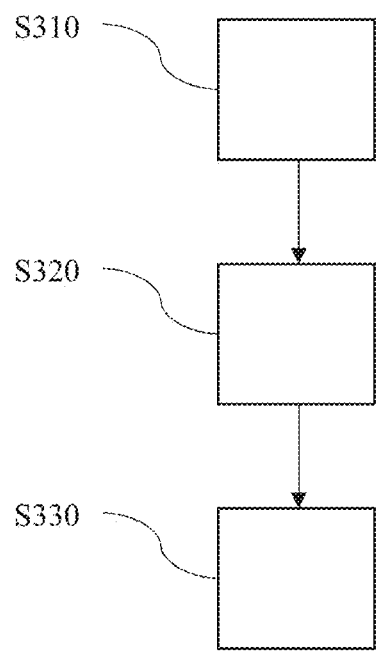
FIG. 3 shows a flow diagram of a method for extraction of measurement data according to embodiments.

FIG. 3 is a flow chart showing embodiments of a method for measuring the bow of irradiated nuclear fuel rods in a nuclear fuel assembly, the method comprising:

In step S310: receiving a first image data frame, captured using an imaging system, said first image data frame comprising information representing a first view of an observed real world scene comprising at least a part of an irradiating nuclear fuel assembly, wherein said first image data frame is captured from a first direction.

The at least a part of a fuel assembly may comprises the entire fuel assembly, or a selected part of the fuel assembly, such as one or more fuel rods comprised in the fuel assembly.

In embodiments, the processor 120, 154 is configured to receive a first image data frame, captured using an imaging system, said first image data frame comprising information representing a first view of an observed real world scene comprising at least a part of an irradiating nuclear fuel assembly, wherein said first image data frame is captured from a first direction.

The method optionally comprises storing the received first image data frame. In an embodiment, a memory 130, 152 is configured to store the first image data frame. The stored image data may be retrieved and used for later analysis in post processing applications.

In an embodiment, image data captured by the imaging system 110 is sent to the processor 120, 154 in real time, or near real time, and the processor 120, 154 is configured to receive and process the image data in real time or near real time.

In an embodiment, image data captured by the imaging system 110 is sent to the processor 120, 154 via the memory 130, 152, thereby inducing a delay between capturing of image data and processing of said image data.

In step S320: generating a set of reference coordinates, corresponding to image coordinates of said first image data frame.

In embodiments, the processor 120, 154 is configured to generate a set of reference coordinates, corresponding to image coordinates of said first image data frame.

The generating a set of reference coordinates may in some embodiments comprise:
receiving a second image data frame, captured using said imaging system, wherein said second image data frame comprises information representing a second view of an observed real world scene comprising at least a part of said irradiating nuclear fuel assembly, wherein said second image data frame is captured from said first direction;
generating a first combined image by combining image data from said first image data frame with image data from said second image data frame; and
determining a set of two or more reference image coordinates that have a predetermined relation to expected image positions of predetermined parts of said fuel assembly based on said first combined image.

In embodiments, the processor 120, 154 is configured to: receive a second image data frame, captured using said imaging system, wherein said second image data frame comprises information representing a second view of an observed real world scene comprising at least a part of said irradiating nuclear fuel assembly, wherein said second image data frame is captured from said first direction; generate a first combined image by combining image data from said first image data frame with image data from said second image data frame; and determining a set of two or more reference image coordinates that have a predetermined relation to expected image positions of predetermined parts of said fuel assembly based on said first combined image.

The combined image may be a panorama image, which is described further in connection with FIGS. 8A to 8D.

A set of reference coordinates as described herein may comprise two or more image coordinates (x,y).

The reference image coordinates are selected such that they have a predetermined relation to expected positions of predetermined parts of said fuel assembly based on said first combined image. For example, the reference coordinates may represent points located on identified predetermined part of a fuel assembly, or points located on a detected physical reference object, typically parallel or substantially parallel to the elongation of the fuel assembly, or points on another identified reference object with a known distance and angle relative to the fuel assembly.

Step S320 may further comprise generating a reference line by performing a linear approximation based on two or more of the reference coordinates of the set of reference coordinates. The processor 120, 154 may be configured to generate a reference line by performing a linear approximation based on two or more of the reference coordinates of the set of reference coordinates.

In embodiments, the set of reference coordinates, possibly in the form of a reference line, is located on, and in the direction of the elongation of, each of a number of fuel rods detected in the first image. The processor 120, 154 may be configured to detect one or more fuel rods depicted in the first image; and, for each detected fuel rod, generate a set of reference coordinates located on the fuel rod; and optionally generate a reference line based on the set of reference coordinates, the reference line extending along the elongation of the fuel rod. In FIG. 8D, a set of reference image coordinates, here forming a reference line, is located on the top rod 826 (in a depiction of a fuel assembly in a horizontal position). Such sets of reference image coordinates may be applied to any or all of the rods comprised in the fuel assembly. This is further described under step S330.

In some embodiments, generating the first combined image comprises stitching overlapping parts of the first and second image data frames, using any stitching technique known in the art. The first combined image may in these embodiments be referred to as a panoramic image. In embodiments, the method comprises generating an edge map based on the first combined image, and determining the set of two or more reference image coordinates based on said edge map. The edge map may be generated by performing edge detection on the first combined image, in any manner known in the art. In an exemplary embodiment, the method comprises performing a Radon transform on the first combined image before the edge detection. The use of a Radon transform helps compensates for the case where the imaging device capturing the images was not properly levelled, or was tilted one or a few degrees.

The processor 120, 154 may be configured to perform combination of image data frames, for example through stitching, in any manner described herein or known in the art.

In step S330: extracting measurement data indicative of a spatial displacement relating to at least a part of said irradiating fuel assembly, based on information from said first image data frame and information from said set of reference coordinates.

The processor 120, 154 may be configured to extract measurement data indicative of a spatial displacement relating to at least a part of said irradiating fuel assembly, based on information from said first image data frame and information from said set of reference coordinates.

The extracting measurement data indicative of a spatial displacement relating to at least a part of said irradiating fuel assembly, based on information from said first image data frame and information from said set of reference coordinates of step S330 may comprise:
  identifying said predetermined parts of the fuel assembly in said first image;
  determining a set of measured image coordinates, wherein each of the measured image coordinates of said set of measured image coordinates is associated with a respective reference image coordinate comprised in the set of reference image coordinates, wherein measured image coordinates in said set of measured image coordinates relate to image positions in which said predetermined parts of the fuel assembly are identified in said first image; and
  extracting measurement data indicative of a spatial displacement, by determining the displacement between each of said image coordinates of said set of reference image coordinates and the corresponding image coordinate of said set of measured image coordinates.

The determining a set of measured image coordinates, wherein each of the measured image coordinates of said set of measured image coordinates is associated with a respective reference image coordinate, may comprise detecting predetermined or selected objects in the first image or combined image. The predetermined or selected objects may be detected using edge detection, pattern recognition, and/or any other suitable object detection method known in the art of image processing. The predetermined or selected objects may for example be spacer grids visible in the image.

The processor 120, 154 may be configured to extract measurement data indicative of a spatial displacement relating to at least a part of said irradiating fuel assembly, based on information from said first image data frame and information from said set of reference coordinate, by: identifying said predetermined parts of the fuel assembly in said first image; determining a set of measured image coordinates, wherein each of the measured image coordinates of said set of measured image coordinates is associated with a respective reference image coordinate comprised in the set of reference image coordinates, wherein measured image coordinates in said set of measured image coordinates relate to image positions in which said predetermined parts of the fuel assembly are identified in said first image; and extracting measurement data indicative of a spatial displacement, by determining the displacement between each of said image coordinates of said set of reference image coordinates and the corresponding image coordinate of said set of measured image coordinates.

The processor 120, 154 may further be configured to determine a set of measured image coordinates, wherein each of the measured image coordinates of said set of measured image coordinates is associated with a respective reference image coordinate, by detecting predetermined or selected objects in the first image or combined image, for example using edge detection, pattern recognition, and/or any other suitable object detection method known in the art of image processing.

Figure 8A:
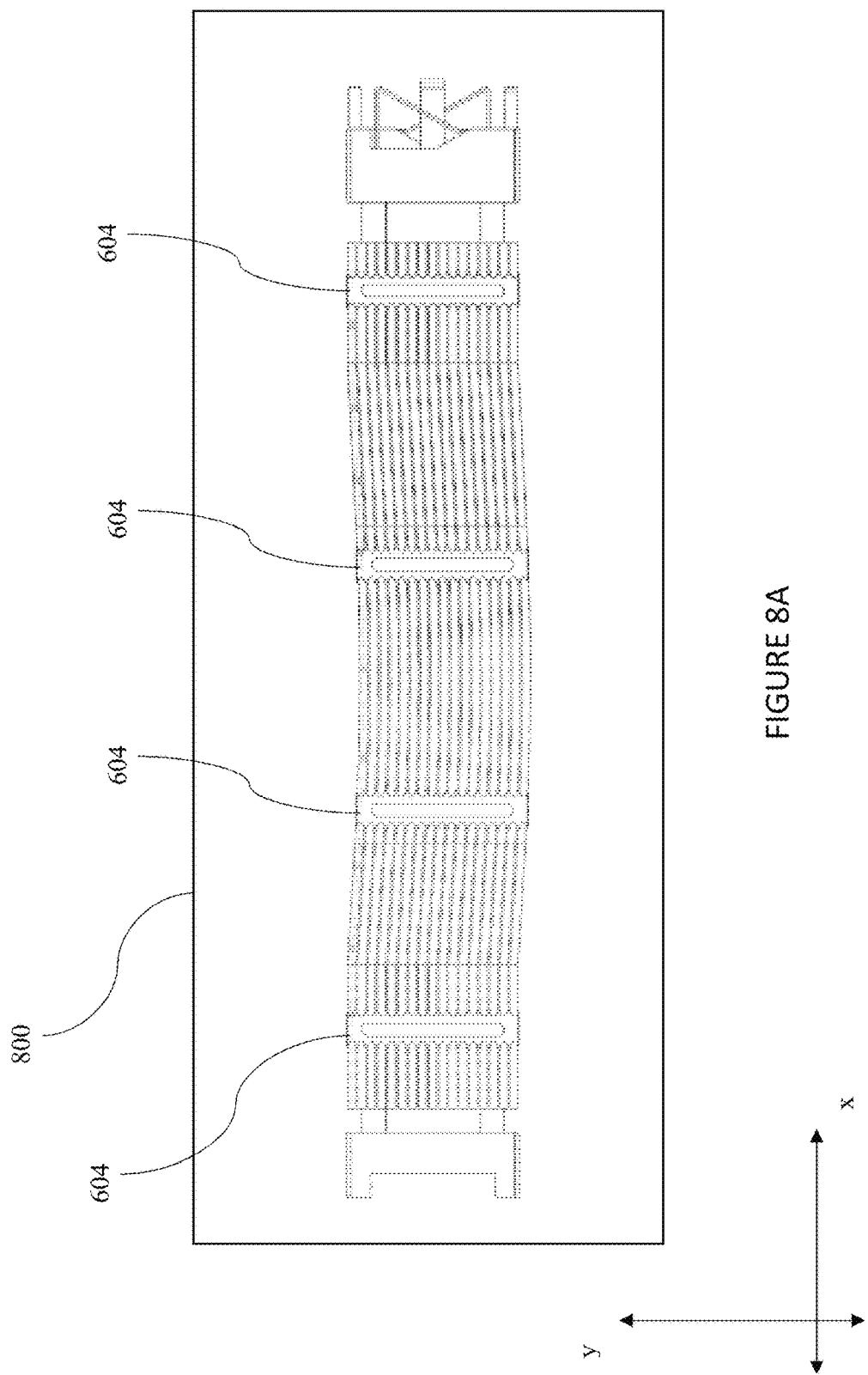
FIG. 8A shows an exemplary combined image comprising image information from a number of captured image data frames.

FIG. 8A shows an exemplary combined image 800 comprising image information from a number of captured image data frames, generated by combining a number of captured image data frames. The captured image data frames depict different parts of a fuel assembly seen from a first direction, and the combined illustrational image 800 is a visual representation of the whole fuel assembly as seen from said first direction.

In embodiments, the image data frames are captured from a first direction by an imaging device that is moving relative to the elongation of the depicted fuel assembly at a predetermined speed. Thereby, image data frames captured at consecutive time instances, for examples consecutive image data frames in a video sequence, show different views of the fuel assembly. In an embodiment, the different views are at least partly overlapping. An example of overlapping images is shown in FIG. 8B.

In some embodiments, extraction of spatial displacement information may be performed based on image data frames, captured by one or more imaging devices, comprising more than one set of image data frames, the sets comprising image data frames captured from different direction. In a non-limiting example, spatial displacement extraction methods presented herein comprise capturing a set of image data frames from four different directions, representing four planar faces of a four faced fuel assembly.

Figure 8B:
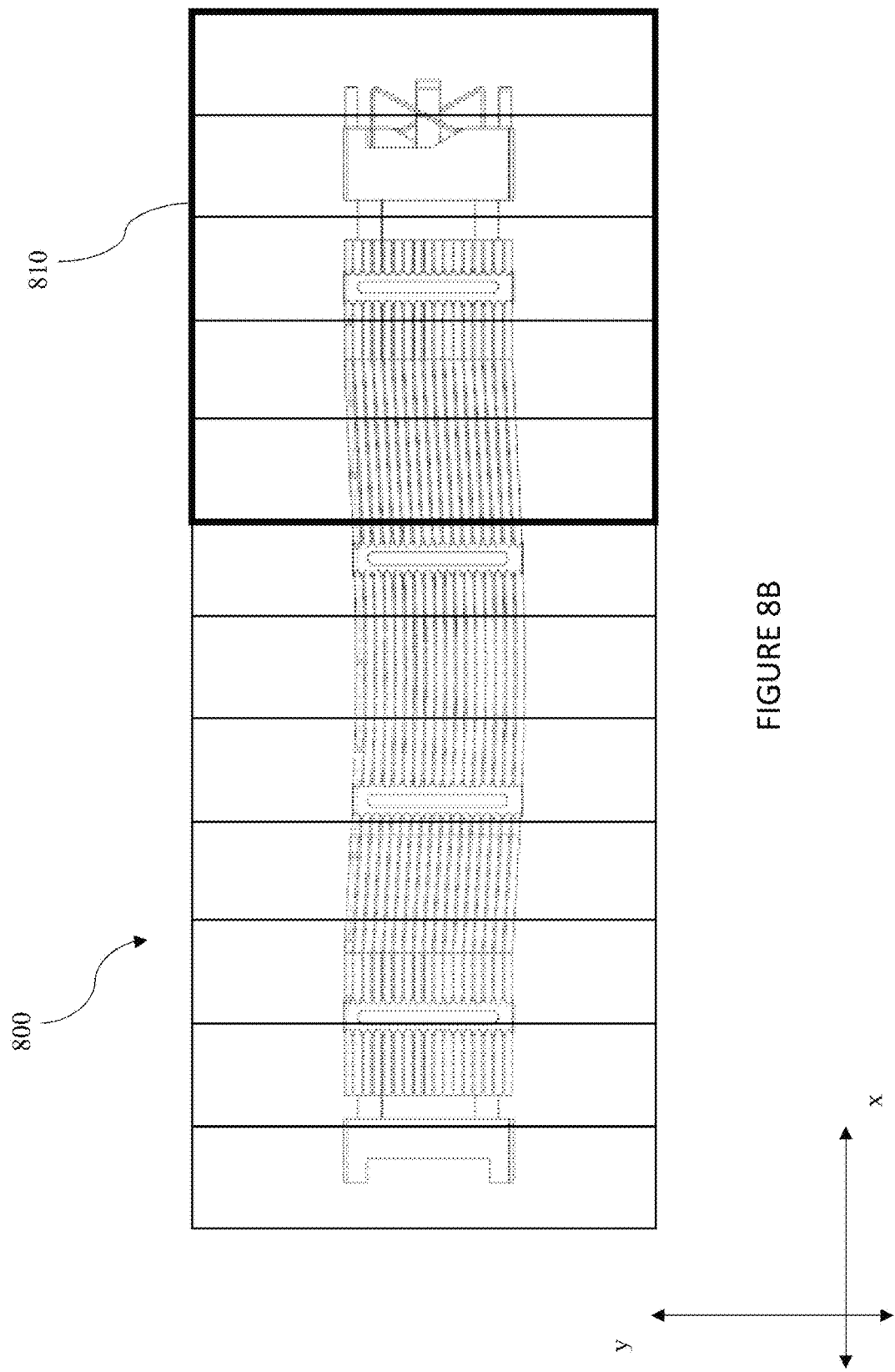
FIG. 8B illustrates stitching to obtain the combined image of FIG. 8A according to some embodiments.

As can be seen from FIG. 8B, a number of at least partly overlapping image data frames 810, one of the image data frames 810 being indicated in the figure, are combined into a panoramic image 800.

Figure 8C:
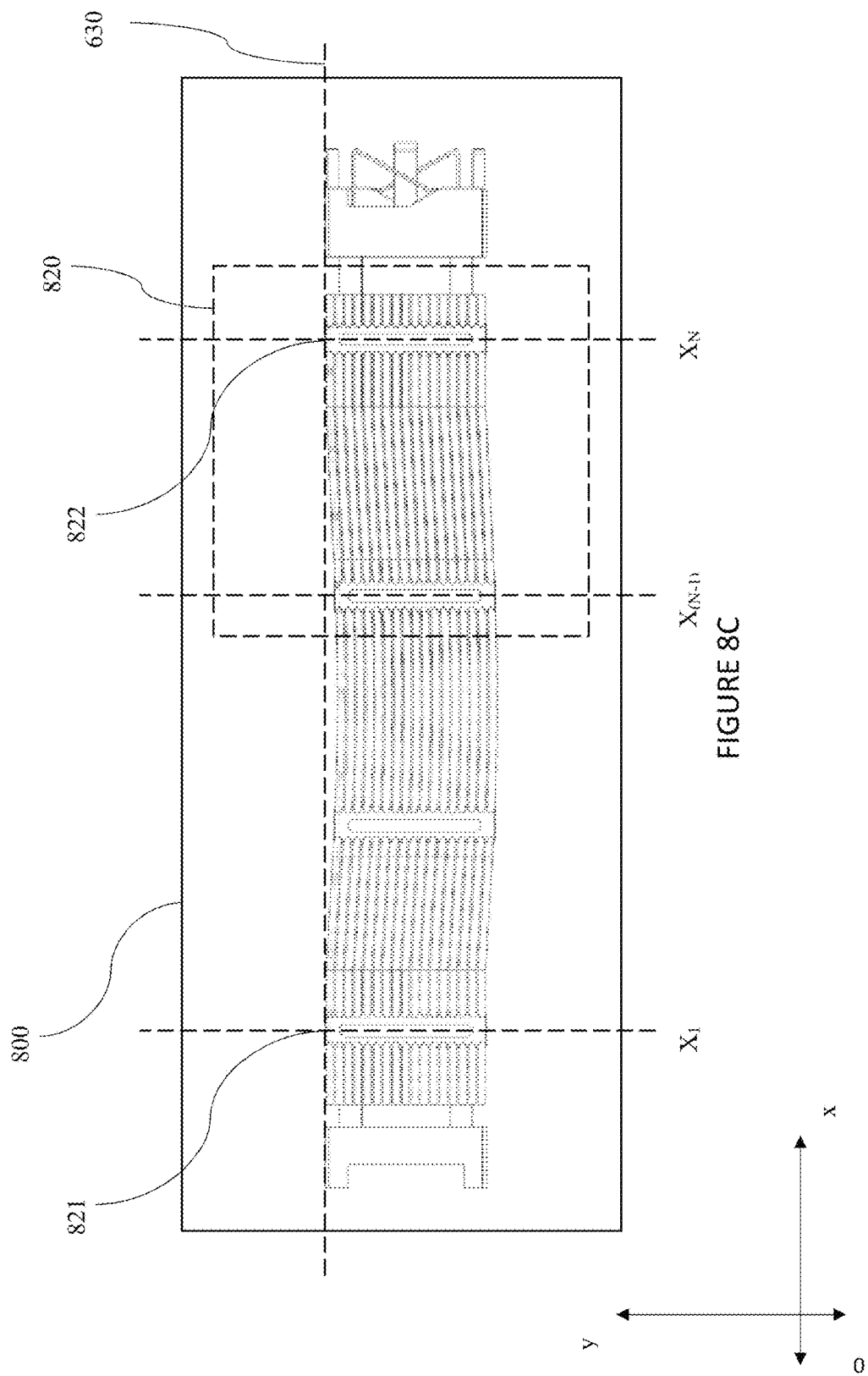
FIG. 8C shows the exemplary combined image of FIG. 8A with an indicated reference used for detection of spatial displacements of the depicted fuel assembly.
Figure 8D:
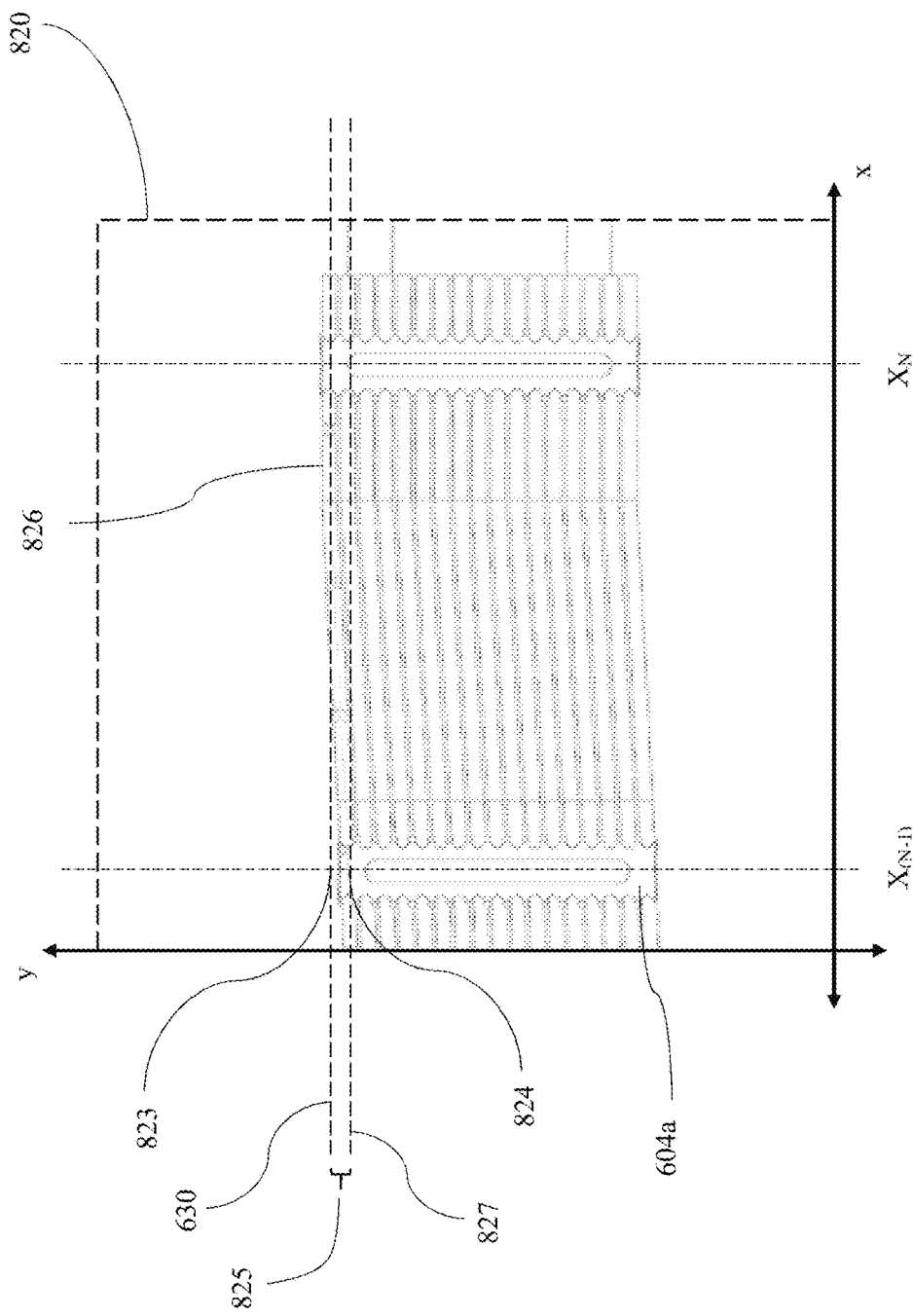
FIG. 8D shows a part of the exemplary combined image of FIG. 8C.

The fuel assembly of the combined image 800 in FIGS. 8A-8C has a number of spacer grids 604 holding the fuel rods in position, in this example illustrated with four spacer grids 604. The methods and systems presented herein may be applied to assemblies having any number of spacer grids. As a non-limiting example, the measured assemblies may have seven spacer grids, according to one of the common standards.

FIG. 8C shows the exemplary combined image of FIG. 8A with an indicated reference 630 in the form of a set of reference points or a line. The reference 630 may be generated in any manner described in connection with the method embodiments described herein. The reference 630 may further be used for detection of spatial displacements of the depicted fuel assembly, according to the method embodiments described herein. FIG. 8C additionally shows intersections 821 and 822 with predetermined horizontal coordinates, $X_1$ and $X_N$, respectively.

In some embodiments, the expected vertical coordinates (y coordinates) may be retrieved by using a physical reference object, relative to the fuel assembly, that is visible in the captured image data frames and may be identified using image analysis methods known in the art.

In some embodiments, the expected vertical coordinates (y coordinates) may be retrieved by using a laser that provides a reference line relative to the fuel assembly and that is visible in the captured image data frames and may be identified using image analysis methods known in the art.

In some embodiments, the expected vertical coordinates (y coordinates) may be retrieved by identifying edges, contrasts or the like that are likely to represent the outer borders of the fuel assemblies in the captured image data frames, using image analysis methods known in the art.

In embodiments illustrated in FIG. 8D, which is a zoomed in part 820 of the image 800 shown in FIG. 8C, extracting measurement data comprises, for each of a selected set of horizontal image coordinates:

For each of a set of one or more predetermined x coordinate values (here exemplified with two x coordinate values $X_{(N-1)}$ and $X_N$):

determining an expected horizontal coordinate, in FIG. 8D the y coordinate value of the exemplary reference line 630 that intersects with the x coordinate value $X_{(N-1)}$ at the indicated intersection 823;

determining a measured horizontal coordinate, i.e. a measured y coordinate determined to be comprised in an area representing a predetermined part of the depicted fuel assembly, here the top fuel rod 826, the y coordinate value being indicated in FIG. 8D as the line 827 that intersects with the x coordinate value $X_{(N-1)}$ at the indicated intersection 824; and determine a distance 825 between the expected horizontal coordinate and the measured horizontal coordinate.

The distance 825 between the expected horizontal coordinate and the measured horizontal coordinate may be determined as a pixel distance in the image. The distance 825 may further be converted to another distance measure, for example millimeters.

Of course, it would be equally possible to compare expected and measured x coordinate values for a selection of corresponding y coordinates if, in the captured image, the fuel assembly is in a vertical position/standing up.

In a non-limiting example, the set of one or more predetermined x image coordinate values each represent a point located on one of one or more spacer grids present in the image. Herein, the x image coordinate $X_{(N-1)}$ relates to a spacer grid 604a. In a non-limiting example, the set of one or more predetermined x image coordinate values each represent a point located on one of one or more spacer grids present in the combined image, wherein the combined image depicts the entire fuel assembly.

In a non-limiting example, an expected y coordinate value and a measured y coordinate value are determined for any or all of a set of fuel rods comprised in the depicted fuel assembly. The expected y coordinate values and a measured y coordinate values may be combined through for example averaging, in any manner known in the art, to obtain an average distance 825 for each x coordinate (for example for every spacer grid). In a non-limiting example, an expected y coordinate value and a measured y coordinate value are determined for the entire fuel assembly.

Figure 4:
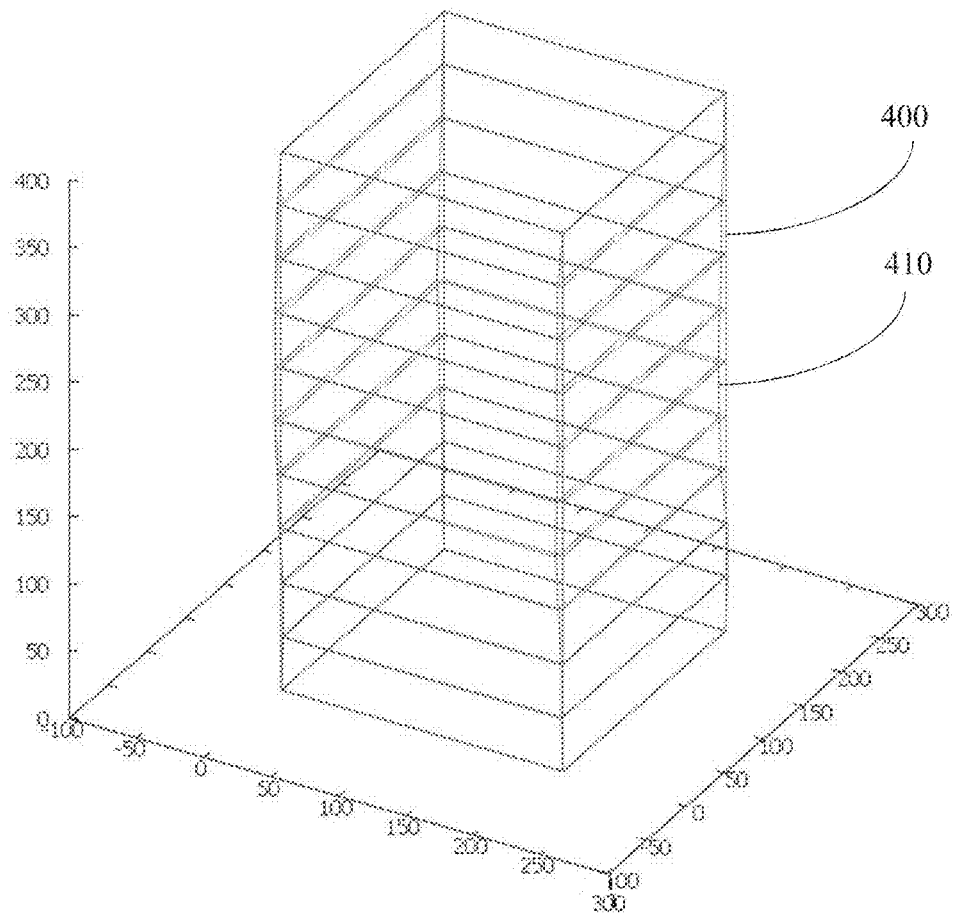
FIG. 4 shows a visual representation in three dimensions based on extracted measurement data.
Figure 5:
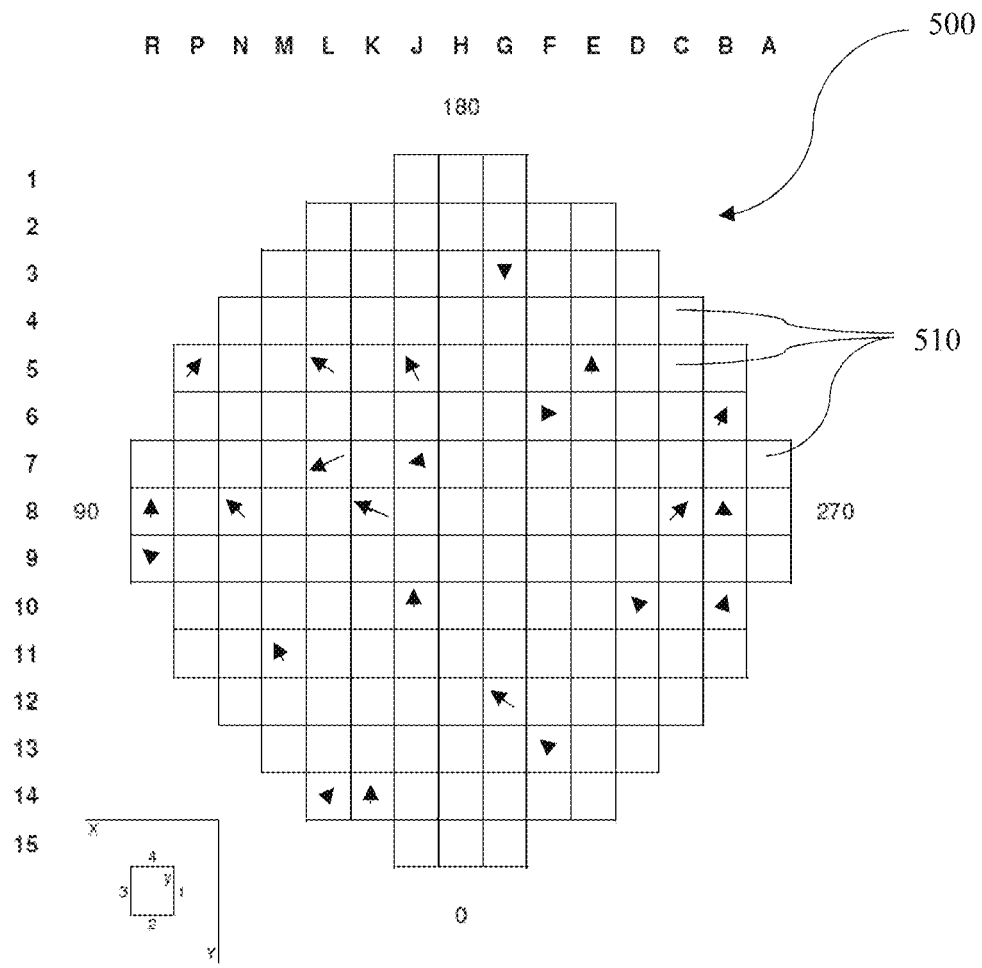
FIG. 5 shows a visual representation of a fuel assembly, seen from above, with indications of spatial displacements.

The obtained distances 825 indicate deviations from the expected, "normal", location of parts of a fuel assembly. By measuring and calculating the distance at a suitable number of x coordinates, for example representing every spacer grid of the fuel assembly or at other suitable intervals, the extracted measurement data can be used to determine a trend of a displacement of the measured fuel assembly. For example, it can be used to determine the direction of the fuel assembly as a function of time, thereby indicating if the fuel assembly is not straight. The obtained distances may be reported to a user, for example via a display 140, as pixel distances, distances in millimeter, or converted to any other suitable distance format. The distances may for example be reported in numeric form, and/or as a visual representation, for instance as illustrated in FIGS. 4 and 5.

In some embodiments, extracting measurement data comprises determining, for any or all of the one or more predetermined x coordinate values (for example representing one or more spacer grids), measured distances between an expected y image coordinate value for any or all of the predetermined parts of a depicted fuel assembly (for example representing one or more fuel rods) and a measured y image coordinate for any or all of the same predetermined parts of a depicted fuel assembly. Expected y image coordinate values for the predetermined parts may be derived separately, according to methods described herein, or a first expected value may be determined for a first predetermined part, for example a first rod identified in an image, and the remaining y image coordinate values are approximated based on the first y image coordinate value and known distances between the predetermined parts, for example fuel rods, in the image.

In an embodiment, the processor 120, 154 is configured to: receive an input signal indicative of on the width of fuel rods comprised in a depicted fuel assembly from an inputter 158, in response to a user interacting with said inputter 158; detect a fuel rod in the image; determine the number of pixels that are comprised within the width of the detected fuel rod; and determine a factor representing a pixel to millimeter quota, for translation between the two distance measures.

A spatial displacement may in this context be indicative of a deformation of said at least a part of said fuel assembly depicted in the first and the second image. This may for example be a deformation of the fuel assembly, such as a bow or twist of the fuel assembly; a deformation of a fuel rod comprised in said fuel assembly, such as a bow, twist or other spatial deformation; or deformation/damage of a spacer grid. Spatial deformations of one or more rods or one or more spacer grids may lead to a reduced distance between adjacent rods. If the fuel rods are placed to near each other, the control rods may not fit between into the fuel assembly, which poses a major security threat.

A spatial displacement may alternatively, or in addition, be indicative of a debris within said fuel assembly.

In embodiments, the extracting measurement data indicative of a spatial displacement is performed for each image data frame in a set of image data frames. Said set of image data frames may be retrieved from an image frame sequence on consecutively captured image frames, captured using an imaging system 110. In some embodiments, the set of image data frames is selected based on selection information, for example a start time and an end time indicating the time instances for capturing of image data frames, or a selection of visual representations of image data frames in a graphical user interface. The selection input may be received from an inputter 158, in response to a user interacting with said inputter 157. The inputter 158 may for example comprise any or all of: a keyboard, a touch screen, a computer mouse, a joystick, or any other suitable type of inputter known in the art. In another embodiment, a set is generated by identifying the first and the last frame in an image frame sequence that comprises part of a fuel assembly.

In embodiments, steps S310 to S330 may be performed on one or more sequences of image data captured from one or more different directions, for example four planar sides of a four faced fuel assembly, six planar sides of a six faced fuel assembly, or one or more sides or views of a fuel assembly of any other shape. When more than one view of a fuel assembly is obtained, measurements and/or detection of objects may be cross-checked to obtain higher reliability.

In embodiments, steps S310, S320 and S330 may be performed on site in real time, during inspection of the fuel assembly, or in post processing using stored image data.

Embodiments of the method presented in connection with FIG. 3 for measuring a spatial displacement of at least a part of an irradiating fuel assembly, such as for example the entire fuel assembly or an irradiating fuel rod comprised in said fuel assembly, are described in connection with FIGS. 8A to 8D.

A spatial displacement indicated by the extracted measurement data may for example be a selection of the following: a deformation of a fuel assembly; a deformation of one or more fuel rods comprised in a fuel assembly; bow of a fuel assembly; bow of one or more fuel rods comprised in a fuel assembly; twist of a fuel assembly; twist of one or more fuel rods comprised in a fuel assembly; change of form and/or diameter of one or more fuel rods comprised in a fuel assembly; increase/decrease in gap sizes between fuel rods comprised in a fuel assembly; debris detected within said fuel assembly; a damaged spacer grid; location of rods in a y direction compared to an expected location in the y direction; width of the rods; angle of the rods; and/or if a spacer grid, the top nozzle and/or bottom nozzle has been tilted compared to the elongation direction of the fuel assembly. Information on or all of these spatial displacements may be obtained using embodiments of the disclosed methods and systems.

The spatial displacements are in many cases indicative of potential security hazards and may lead to damages and/or expensive down-time of the reactor core if left unnoticed. Furthermore, information on any spatial displacements over time may be used for trending of deviations and predictions of upcoming problems. Information on spatial displacements may further be used for optimization of placement of fuel assemblies in a reactor core, thereby enabling optimization of reactor core efficiency and sustainability.

The present disclosure is particularly advantageous in that the method and system embodiments presented herein provides information on any or all of these spatial displacements from image data that has been retrieved at a previous measurement of the fuel assemblies, for example during inspection or maintenance. Thereby, additional information and basis for decision on how to optimize the reactor core or where to look for defects, debris et cetera is provided without the need for extra measurements of fuel assemblies.

Another advantage is that the information may be obtained for every fuel assembly that has been captured by an imaging device during the inspection or maintenance session for example, which in many cases is all of the fuel assemblies of the reactor core. In prior art methods, only a small selection of the assemblies of the reactor core are measured, since the prior art methods require time consuming and thereby very expensive relocation and often fixture of each of the fuel assemblies to be measured. Placing the assembly in a fixture is disadvantageous in that it is time consuming and in that re-location and placement in a fixture always causes an extra risk of damaging the fuel assembly. By combining several images into a combined image according to embodiments herein, reliable/accurate extraction of measurement data and conclusions based on the extracted measurement data is obtained without the need for fixating the fuel assembly in relation to the imaging device that is used for capturing the image data frames. As each pixel in the combined image is influenced by pixel values from more than one image, the combined pixel value is more reliable in the case one of the image is of low quality due to noise and/or bad lighting, and noise such as salt and pepper noise is removed from the combined image while details present in the depicted real world scene are kept.

Measurement data extracted according to embodiments herein may advantageously be used for drawing conclusions, manually or automatically through calculations of the processor 120, 154, on spatial displacements, for example: deformations/bow/twist of fuel assemblies; deformation/bow/twist of separate fuel rods; the presence and/or location of debris within the reactor core; or damages to spacer grids on a fuel assembly. This in turn enables drawing of conclusions on type and magnitude of the problem caused by any detected spatial displacement, and further forms a basis for decision on whether the problem needs to be addressed. Such conclusions may in some embodiments be performed manually, by a user analyzing measurement data presented by the system, in any suitable form. In other embodiments, the methods presented herein further comprises, and the processor 120, 154 is further configured to, drawing conclusions on the extracted measurement data. The method may further comprise, and the processor 120, 154 may further be configured to, generating visual, audio and/or other type of user perceivable feedback indicative of the conclusions. For example, the processor 120, 154 may be configured to control a display 140 to display a visual representation of image data and/or image data related information such as measurement results and/or conclusions on deviations and locations of deviations.

The stored image data and/or extracted measurement data may be retrieved and analyzed at a later time, for example to find the source of, or a trend relating to, a potential fuel assembly related problem.

In embodiments, methods presented herein further comprise determining if one or more part of the fuel assembly comprises a deformation, based on the extracted measurement data. In some embodiments, the determination comprises comparing extracted measurement data to threshold values or intervals based on known tolerances, which may differ for different countries, power plants and types of reactors and assemblies, and determining that there is a deformation if an extracted measurement data value is for example above a threshold value or outside a threshold interval. The processor 120, 154 may be configured to determine if one or more part of the fuel assembly comprises a deformation, based on the extracted measurement data, for example by comparing extracted measurement data to threshold values or intervals based on known tolerances, which may differ for different countries, power plants and types of reactors and assemblies, and determining that there is a deformation if an extracted measurement data value is for example above a threshold value or outside a threshold interval.

In some embodiments, the method further comprises determining an optimal placement of the measured fuel assemblies inside the reactor core based on obtained information on spatial displacements. In some embodiments, the processor 120, 154 is configured to determine an optimal placement of the measured fuel assemblies inside the reactor core based on obtained information on spatial displacements.

A further advantage is that since the image data is already available, information on spatial displacements obtained using the methods and systems presented herein may be calculated in line as soon as the image data is available and may thereby be used to determine for example how to replace the fuel assemblies into the reactor core in order to optimize its performance and sustainability. If the spatial displacement extraction is performed in post processing, possible on a remote site, the information obtained may be used for determining optimal placement of the fuel assemblies for future rearrangement.

As is understood by a person skilled in the art, movements of the imaging devices relative to the fuel assembly may result in consecutively captured image frames not being perfectly aligned in the horizontal direction. Therefore, the capturing of image data frames, and/or the extracting of data based on the first image and the second image, may comprise the additional step of aligning the image data frames with regard to the image content before extraction of data. Aligning may be performed in any manner known in the art.

FIG. 8A shows a set of captured image data frames, here combined into a combined/panorama image 800 for illustrational purposes. In some embodiments, a panorama image 800 is generated based on a set of captured image data frames representing different parts of a first side of a fuel assembly, wherein the generated image is combined such that the complete first side of the fuel assembly is depicted in one image. In embodiments, the combination of a set of image data frames may comprise identifying pixel values of image areas/elements near the edge of a first image that correlates to a large degree with pixel values of image areas/elements near the opposite edge of a second image and combining the two images such that the corresponding image areas/elements overlap in the combined image. The panorama image may be generated from the set of captured image data frames in any manner known in the art. In another embodiment, it is assumed that the imaging device and the fuel assembly being depicted move relative to each other at a predetermined speed and direction, whereby it may be approximated which parts of consecutive images represent the same part of the real world scene.

In all of the images 8A to 8D, the illustrated fuel assembly is represented in a horizontal position (laying down), meaning that the elongation of the x axis relates to the height of a fuel assembly when it is placed in its position in a reactor core. It should be noted that the y axis indicated in FIGS. 8A to 8D does not necessarily relate to a vertical direction in the real physical world. However, the indicated y axis will always be perpendicular to the indicated x axis. The methods and calculations described are thereby equally applicable to images where the fuel assembly is represented in a vertical position (standing up), and the reference values/the reference line indicate y coordinate values instead of the x coordinate values. The calculations would in this case have to be adapted accordingly, in manners known to a person skilled in the art.

Measurement values extracted using embodiments presented herein are indicative of displacements between expected reference coordinates and corresponding measured coordinates associated with predetermined parts of a fuel assembly. For example, the expected and measured image coordinates for the intersections of the center or other part of each fuel rod comprised in the fuel assembly and each spacer grid of the fuel assembly may be compared in order to obtain measurement data indicative of displacements between the expected and measured image coordinates. The displacements may after extraction be stored or presented to a user in a report of in a graphical user interface on a display 140. The displacements may be expressed in terms of pixel distances or other distance measures such as millimeters for example, after conversion from pixel distances to millimeters. In embodiments, the processor 120, 154 is configured to convert the displacements from pixel distances to millimeters, based on a conversion factor. The conversion factor may be determined based on a comparison between the number of pixels comprised in a part of an image identified to represent the width of a fuel rod and a rod dimension value, for example the width of a rod or distance between two adjacent rods, input by a user using the inputter 158. Alternatively, the conversion factor may be determined based on a comparison between the number of pixels comprised in a part of an image identified to represent the width of a fuel rod and rod dimensions or other relevant parameters retrieved from a memory in response to receiving a selection input indicative of a predefined assembly type, the input being provided by a user using the inputter 158. In embodiments, the processor 120, 154 may be configured to determine a conversion factor according to any of the described approaches. In some embodiments, a conversion factor is calculated for every analyzed image data frame, to compensate for any changes in distance between the fuel assembly 600 and the imaging device 110.

Determination of Deformation

The method according to any of the embodiments presented herein may further comprise determining if the fuel assembly comprises a deformation, based on the measurement data.

In embodiments, determining image areas/coordinates in which the measurement data indicates deformation of a fuel assembly comprises comparing extracted measurement data to threshold values or allowed tolerance values; determining image areas or coordinates that comprise detected displacement; and possibly also determine which corresponding parts of the observed fuel assembly that comprise detected displacements.

Information on detected deformations may be used for automatic calculations and determination of, or fed back to a user of the measurement system to provide a basis for a decision on, whether:

additional inspection is needed relating to a part of the fuel assembly likely to comprise deformations;

a selection of the fuel assemblies could be relocated within the reactor core, based on the detected displacements of the fuel assemblies, according to any of the embodiments described herein, to provide a better sustainability;

fuel assemblies are too close meaning that there is a risk that:

the fuel assemblies may interfere with and damage each other when moved, thereby causing particles coming off and ending up in the reactor;

there is not enough water circulation between the fuel assemblies, and from this deciding if there is a risk that the temperature will rise above allowed tolerances, which will in turn lead to larger deformations and problems with oxide, whereby the temperature increases, and so on; and/or the control rods will not fit into the fuel assembly, which is a major security hazard.

The sustainability is very important from a security perspective, but also from an economical perspective as nuclear fuel is very expensive.

Presentation of Extracted Measurement Data

In embodiments, a visual representation may be generated based on extracted measurement data. Two non-limiting examples of visual representations generated based on extracted measurement data are shown in FIGS. 4 and 5. From the visual representations of FIGS. 4 and 5, interpretation of spatial displacements of an investigated fuel assembly is enabled. Such a displacement may for example represent bow, twist or another deformation of the fuel assembly; a deformation of a fuel rod comprised in the assembly; a debris within the fuel assembly; and/or a damaged spacer grid.

FIG. 4 shows an exemplary visual representation in three dimensions based on extracted measurement data obtained by embodiments described herein, illustrating the expected, unbowed, shape/volume 400 of a fuel assembly compared to the actual shape 410 of a measured fuel assembly extrapolated from the extracted measurement data.

Another exemplary visual representation is shown in FIG. 5, illustrating a simplified representation of fuel assembly 500, as seen from above, comprising a number of fuel rods 510 (only three of them indicated with the number 510 in the figure for ease of interpretation). As can be seen from the figure, some of the fuel rods 510 have indications of spatial displacements in the form of arrows, in this example indicating the direction and magnitude of the bow of the individual rods comprised in the fuel assembly.

In embodiments, the combined image and/or the measurement data in different forms such as numerical values or graphical representations is displayed to a user of the system on a display device 140. In embodiments, an off-site analysis is performed close in time to capturing of the image data. In another embodiment, an off-site analysis is performed at a later time in order to for example verify the source of a suspected problem that arises weeks, months or even years after the capturing of the image data. In some embodiments, stored image data from different measurements at different time instances is further combined, to enable determination of changes over time and prediction of possible future problems with fuel deformations. For such analysis, different embodiments presented herein may comprise presenting to a user: raw measured values, i.e. extracted measurement data values and displacements from expected values in a numeric form; visual representations of measured data values and variations/displacements compared to expected values, as exemplified in two ways in FIGS. 4 and 5; and/or conclusions derived by the measurement system based on the extracted measurement data regarding any detected displacements or problems; and possibly also optimization possibilities based on the detected displacements, or the gravity of any detected problem and/or an approximated emergency of resolving the problem.

The processor 120, 154 according to any of the present embodiments may be configured to perform any or all of the method steps and functions described herein.

In an embodiment, there is provided a computer program product configured to, when executed in a computing device, control a processor to measure a spatial displacement relating to at least a part of an irradiating fuel assembly, by: receiving a first image data frame, captured using an imaging system, said first image data frame comprising information representing a first view of an observed real world scene comprising at least a part of an irradiating nuclear fuel assembly, wherein said first image data frame is captured from a first direction; generating a set of reference coordinates, corresponding to image coordinates of said first image data frame; and extracting measurement data indicative of a spatial displacement relating to at least a part of said irradiating fuel assembly, based on information from said first image data frame and information from said set of reference coordinates.

The computer program product may further be configured to, when executed in a computing device, control a processor to perform any or all of the method steps and functions described herein.

The invention claimed is:

1. A system for measuring a spatial displacement relating to at least a part of a nuclear fuel assembly, the system comprising:

an imaging system comprising:
i) a frame,
ii) a first camera attached to the frame and oriented in a first direction, and
iii) a second camera attached to the frame and oriented in a second direction that is different from the first direction, wherein the frame is dimensioned such that the first camera and second camera are configured to simultaneously capture different faces of the nuclear fuel assembly;

a memory; and a processor configured to receive data from said memory, the processor further being configured to:

obtain a first image data frame, captured using the first camera of the imaging system positioned with the first camera and the second camera at a first longitudinal location between a two ends of the nuclear fuel assembly, said first image data frame comprising information representing a first view of an observed real world scene comprising at least a part of a lateral face of said nuclear fuel assembly, wherein said first image data frame is captured from the first direction;

generate a set of reference coordinates based on the first image data frame;

obtain a second image data frame having been captured by the first camera from the first direction and comprising information representing a second view of the observed real world scene comprising at least another part of the lateral face of said nuclear fuel assembly, wherein the first view and the second view are different from one another and wherein the first image data frame and the second image data frame are captured by the first camera at approximately a same distance from the nuclear fuel assembly from a different longitudinal location relative to the nuclear fuel assembly;

combine at least the first image data frame and the second image data frame to result in a combined image of the lateral face; extract measurement data indicative of a spatial displacement relating to at least a part of said nuclear fuel assembly, based on the combined image information from said first image data frame, based on information from the second image data frame, and based on information from said set of reference coordinate; and control a display to display a visual representation of said measurement data.

2. The system of claim 1, wherein the processor is further configured to:

identify predetermined parts of the fuel assembly in said first image;

determine a set of measured image coordinates, wherein each of the measured image coordinates of said set of measured image coordinates is associated with a reference image coordinate comprised in the set of reference image coordinates, wherein measured image coordinates in said set of measured image coordinates relate to image positions in which said predetermined parts of the fuel assembly are identified in said first image; and extract measurement data indicative of a spatial displacement, by determining the displacement between each of said image coordinates of said set of reference image coordinates and the corresponding image coordinate of said set of measured image coordinates.

3. The system of claim 1, wherein the processor is further configured to approximate a reference line, by performing a linear approximation based on two or more reference image coordinates comprised in said set of reference coordinates.

4. The system of claim 1, wherein the processor is configured to extract the measurement data indicative of a spatial displacement for each image data frame in a set of image data frames.

5. The system of claim 1, wherein the processor is further configured to determine if one or more part of the fuel assembly comprises a deformation, based on the extracted measurement data.

6. The system of claim 1, wherein
the second camera on the frame is diametrically opposed to the first camera.

7. The system of claim 1, wherein said extracting the measurement data comprises comparing information from the first image data frame and from the second image data frame to the same reference line.

8. The system of claim 1, wherein the first image data frame and second image data frame are captured by moving the nuclear fuel assembly relative to the camera.

* * * * *